United States Patent
Naito et al.

(10) Patent No.: US 11,374,443 B2
(45) Date of Patent: Jun. 28, 2022

(54) ROTARY ELECTRIC MACHINE

(71) Applicant: DENSO CORPORATION, Kariya (JP)

(72) Inventors: Akihito Naito, Kariya (JP); Katsuya Fujisaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 16/582,247

(22) Filed: Sep. 25, 2019

(65) Prior Publication Data

US 2020/0106311 A1 Apr. 2, 2020

(30) Foreign Application Priority Data

Sep. 27, 2018 (JP) .............................. JP2018-182226

(51) Int. Cl.
| | |
|---|---|
| *H02K 1/16* | (2006.01) |
| *H02K 1/27* | (2022.01) |
| *H02K 21/14* | (2006.01) |
| *H02K 1/276* | (2022.01) |

(52) U.S. Cl.
CPC ............. *H02K 1/165* (2013.01); *H02K 1/276* (2013.01); *H02K 21/14* (2013.01)

(58) Field of Classification Search
CPC ........ H02K 1/165; H02K 1/276; H02K 21/14; H02K 1/146; H02K 1/16; H02K 2201/06; H02K 2213/03
USPC ...................................................... 310/156.56
See application file for complete search history.

(56) References Cited

U.S. PATENT DOCUMENTS

| | | |
|---|---|---|
| 5,142,179 A | 8/1992 | Nakamura et al. |
| 2003/0098628 A1* | 5/2003 | Enomoto ............... H02K 1/187 310/216.057 |
| 2004/0195926 A1 | 10/2004 | Hiwaki et al. |
| 2008/0054737 A1* | 3/2008 | Inayama ................ H02K 1/148 310/44 |
| 2009/0133243 A1* | 5/2009 | Akita .................... H02K 15/022 29/596 |
| 2011/0020154 A1* | 1/2011 | Matsuda ................ H02K 3/325 417/410.1 |

(Continued)

FOREIGN PATENT DOCUMENTS

| | | |
|---|---|---|
| JP | H05-83891 A | 4/1993 |
| JP | H05-91162 U | 12/1993 |

(Continued)

OTHER PUBLICATIONS

Translation of foreign document JP 2016111731 A (Year: 2016).*

*Primary Examiner* — Alex W Mok
(74) *Attorney, Agent, or Firm* — Maschoff Brennan

(57) ABSTRACT

A rotary electric machine is provided including: a stator having a stator core having an annular shape; a rotor disposed facing the stator in a radial direction, including one pair or a plurality of pairs of magnetic poles along a circumferential direction; and a housing having a cylindrical shape, in which the stator core is fixed to an inner periphery surface thereof, in which the stator core includes a back yoke having an annular shape fixed to the inner periphery surface of the housing, and a teeth provided along the radial direction from an inner periphery of the back yoke; a cutout that opens outwards the radial direction is provided in an outer periphery of the back yoke; and the cutout is provided to overlap a range of the teeth in the circumferential direction.

10 Claims, 5 Drawing Sheets

(56) References Cited

U.S. PATENT DOCUMENTS

| | | | | |
|---|---|---|---|---|
| 2013/0038169 A1* | 2/2013 | Sato | ................. | H02K 1/148 |
| | | | | 310/216.009 |
| 2013/0313938 A1* | 11/2013 | Yamada | ............... | H02K 1/2713 |
| | | | | 310/156.69 |
| 2014/0062249 A1* | 3/2014 | Nagao | ................ | H02K 3/345 |
| | | | | 310/215 |
| 2014/0252904 A1* | 9/2014 | Mikami | ................ | H02K 5/04 |
| | | | | 310/156.66 |
| 2017/0256997 A1* | 9/2017 | Nakayama | ............... | H02K 1/28 |
| 2017/0331336 A1* | 11/2017 | Hayashi | ................ | H02K 1/18 |
| 2017/0358961 A1* | 12/2017 | Kitamura | ............... | H02K 1/185 |
| 2018/0198333 A1* | 7/2018 | Ohori | ................ | H02K 1/2773 |

FOREIGN PATENT DOCUMENTS

| | | | |
|---|---|---|---|
| JP | H07-31086 A | | 1/1995 |
| JP | 2001-258225 A | | 9/2001 |
| JP | 2012-253834 A | | 12/2012 |
| JP | 2014-138434 A | | 7/2014 |
| JP | 2014-153069 A | | 8/2014 |
| JP | 2015-139265 A | | 7/2015 |
| JP | 2016111731 A | * | 6/2016 |

* cited by examiner

ROTARY ELECTRIC MACHINE

CROSS-REFERENCE TO RELATED APPLICATION

This application is based on and claims the benefit of priority from earlier Japanese Patent Application No. 2018-182226 filed Sep. 27, 2018, the description of which is incorporated herein by reference.

BACKGROUND

Technical Field

The present disclosure relates to a rotary electric machine.

Description of the Related Art

One example of a conventional rotary electric machine includes an annular shaped stator fixed to an inner periphery surface of the housing having a cylindrical shape, and a rotor disposed facing the stator in a radial direction. The stator is provided with a stator core having an annular shape and a stator winding wound around slots of the stator core. The stator core is fixed to the housing by press-fitting, adhering, shrink-fitting or the like to the inner periphery surface of the housing.

SUMMARY

The present disclosure provides a rotary electric machine including: a stator having a stator core having an annular shape; a rotor disposed facing the stator in a radial direction, including one pair or a plurality of pairs of magnetic poles along a circumferential direction; and a housing having a cylindrical shape in which the stator core is fixed to an inner periphery surface thereof, wherein the stator core includes a back yoke having an annular shape fixed to the inner periphery surface of the housing, and a teeth provided along the radial direction from an inner periphery of the back yoke; a cutout that opens outwards the radial direction is provided in an outer periphery of the back yoke; and the cutout is provided to overlap a range of the teeth in the circumferential direction.

DETAILED DESCRIPTION OF THE PREFERRED EMBODIMENTS

Figure 1:
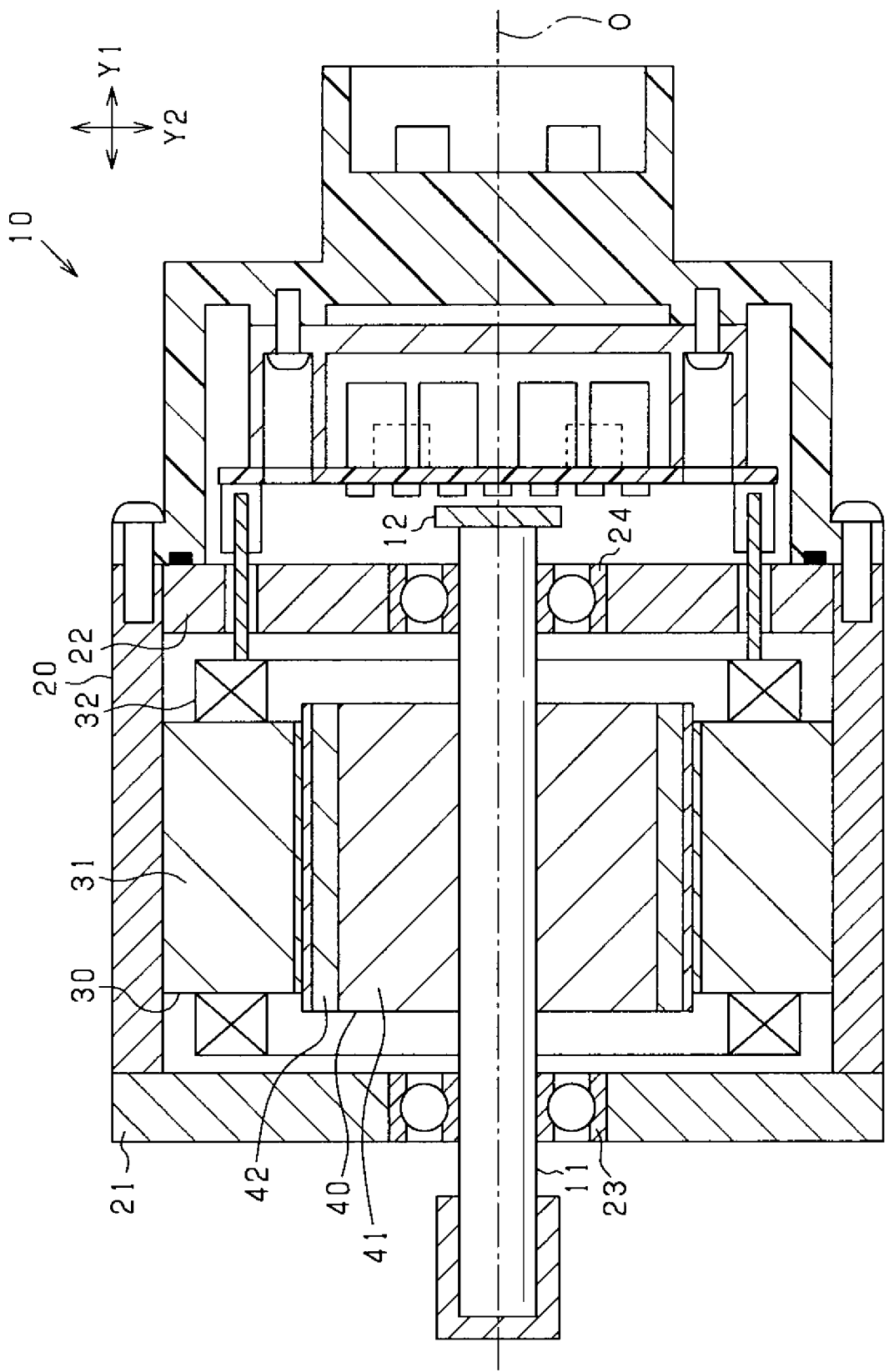
FIG. 1 is a diagram showing an axial cross-sectional view of a motor according to an embodiment of the present disclosure.

According to the above-described rotary electric machine, since a torque is produced in the circumferential direction, when fixing the stator to the housing, the stator needs to be prevented from being rotated in the circumferential direction. In this respect, for example, JP-A-2014-138434 discloses a configuration in which the fixed portion that applies a compressive stress in the radial direction is provided between the housing and the stator core such that the fixed portion bites into the inner periphery surface of the housing or the outer periphery surface of the stator core. Hence, the stator can be appropriately fixed to the housing.

However, according to the configuration disclosed in the above-described patent literature, in the case where the fixed portion is provided or adhered, compared to a case of press-fitting, the number of components or manufacturing steps increases so that the manufacturing cost increases. However, sufficient press-fitting margin need to be secured before press-fitting in order to appropriately prevent the stator from being rotated when performing the press-fitting, such that the outer diameter of the stator core is set to be larger than the inner diameter of the housing before fixing. In this case, there is a concern that excessive stress may be applied to the stator core so that the stator core may be deformed. In the case where the stator core is deformed, there is a concern that a magnetic loss may become too high.

The present disclosure provides a rotary electric machine capable of suppressing distortion of the stator core when the stator core is press-fitted to the housing. As a first aspect of the present disclosure, a rotary electric machine is provided including: a stator having a stator core having an annular shape; a rotor disposed facing the stator in a radial direction, including one pair or a plurality of pairs of magnetic poles along a circumferential direction; and a housing having a cylindrical shape, in which the stator core is fixed to an inner periphery surface thereof, wherein the stator core includes a back yoke having an annular shape fixed to the inner periphery surface of the housing, and a teeth provided along the radial direction from an inner periphery of the back yoke; a cutout that opens outwards the radial direction is provided in an outer periphery of the back yoke; and the cutout is provided to overlap a range of the teeth in the circumferential direction.

The cutouts are provided in the outer periphery of the back yoke, which open towards outside in the radial direction. Thus, even when the back yoke is press-fitted to the inner periphery of the housing, the stress applied to the back yoke in the radial direction can be released by the cutouts. Hence, the back yoke can be prevented from being deformed. Further, the cutouts are provided so as to overlap the range of the teeth in the circumferential direction. Thus, the thickness of the back yoke in the radial direction is secured and the magnetic path where the magnetic flux flows is secured. That is, a magnetic saturation or a distortion of the flow of the magnetic flux can be suppressed. Accordingly, magnetic loss is suppressed, and small sizing and lighting weighting can be accomplished for the rotary electric machine. Also, an amount of current is reduced so that an amount of heat can be suppressed. Moreover, a torque ripple can be suppressed.

Hereinafter, with reference to the drawings, embodiments of the present disclosure will be described. In the respective embodiments, the same reference numbers are applied to the same portions or equivalent portions and the explanation thereof will be applied to portions having the same reference numbers. For example, a motor 10 as a rotary electric machine of the first embodiment is used for an electric power steering apparatus (hereinafter referred to as EPS apparatus) that assists a steering operation performed by the driver.

The motor 10 shown in FIG. 1 is a permanent magnet field motor. Specifically, the motor 10 is configured as a permanent magnet field motor having three phase windings. In other words, the motor 10 is configured as a brush-less motor. The three phase windings may have two systems. The motor 10 is provided with a housing 20, a stator 30 fixed to the housing 20, a rotor 40 rotating with respect to the stator 30, and a rotary shaft 11 to which the rotor 40 is fixed. Hereinafter, according to the present embodiment, an axial direction refers to an axial direction of the rotary shaft 11 (axial direction is indicated by an arrow Y1 in FIG. 1). A radial direction refers to a radial direction of the rotary shaft 11 (radial direction is indicated by arrow Y2 in FIG. 1). A circumferential direction refers to a circumferential direction of the rotary shaft 11 (circumferential direction is indicated by an arrow Y3 in FIG. 1).

The housing 20 is formed in a cylindrical shape. The hosing 20 accommodates a stator 30 and a rotor 40 or the like. The housing 20 includes over members 21, 22 each having a disc shape. The openings of the housing 20 at the both ends in the axial direction thereof are covered by respective cover members 21 and 22.

In FIG. 1, the cover member 21 disposed in the left side is formed in a disc shape having an outer diameter similar to that of the housing 20, and fixed to the housing 20 with a screw or the like. In FIG. 1, the cover member 22 disposed in the right side is formed in a disc shape having an inner diameter similar to that of the housing 20, and press-fitted to the inner periphery surface of the housing 20 with a screw or the like.

Figure 2:
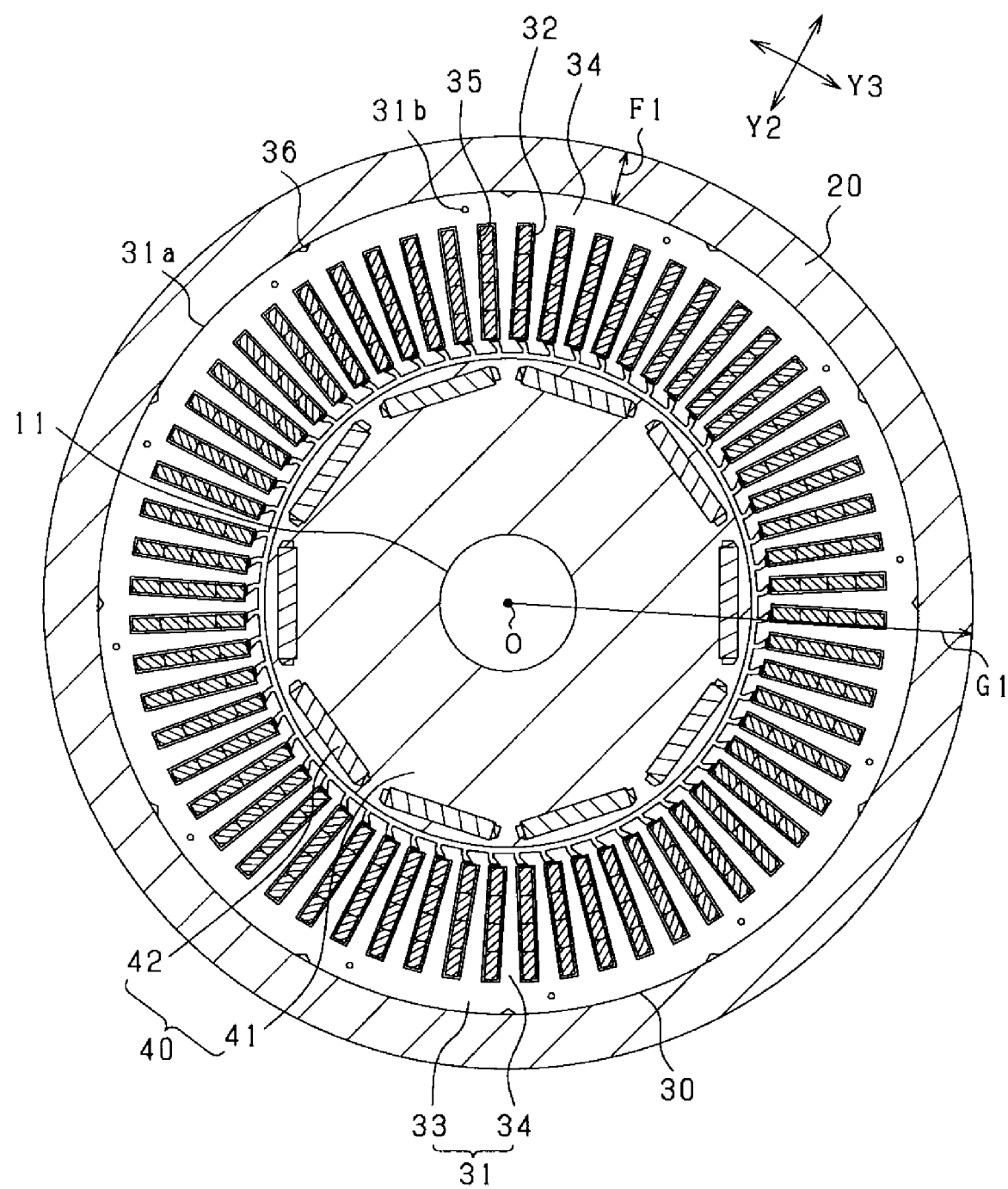
FIG. 2 is a diagram showing a radial cross-sectional view of the motor.

In the housing 20 (specifically, cover members 21 and 22), a bearing 23 and 24 are provided. The bearing 23 and 24 supports the rotary shaft 11 to be rotatable. The center of axis of the inner periphery surface of the housing 20 is the same as that of the rotary shaft 11. Also, as shown in FIG. 2, the cross-sectional shape of the inner periphery surface of the housing 20 in the radial direction is true circular shape having no roughness (i.e. concave and convex) shape. In the tip end side of the rotary shaft 11, an angular sensor 12 is provided. The angular sensor 12 may be a magnetic sensor or a resolver.

The stator 30 is provided having a cylindrical shape and disposed along the inner periphery of the housing 20 in substantially center portion in the axial direction of the housing. The stator 30 is fixed to the inner periphery surface of the housing 20 in which the center thereof is the center of axis O of the rotary shaft 11. The stator 30 constitutes a part of the magnetic circuit and includes a stator core 31 and a stator winding 32 (armature coil). The stator coil 30 has an annular shape and is disposed facing the outer periphery side of the rotor 40 in the radial direction. The stator winding 32 is wound around the stator core 31.

As shown in FIG. 2, the stator core 31 includes a back yoke 33 having an annular shape, and a plurality of teeth 34 protruded from the back yoke 33 towards inward side in the radial direction and arranged in the circumferential direction at predetermined intervals. A plurality of slots 35 (stator slot) are formed between adjacent teeth 34. The slots 35 are disposed in the circumferential direction at the same intervals. The stator winding 32 is wound around the slots 35. According to the present embodiments, the number of teeth 34 is 60, and the number of slots is 60. However, the number of teeth 34 and the slots may be set to be any number. These slots 35 serve as U phase slot, V phase slot and W phase slot in the circumferential direction. The stator winding 32 is accommodated/supported in the slots 35.

The stator core 31 is configured as an integrated structure that integrates a plurality of core sheets 31a laminated in the axial direction of the stator core 31. Each core sheet has an annular shape and composed of a plurality of thin plate shaped magnetic material. The core sheer 31a is formed by press-punching a belt-shaped electromagnetic steel sheet. According to the present embodiment, caulking process is performed to fix the respective core sheets 31a being laminated.

Figure 3:
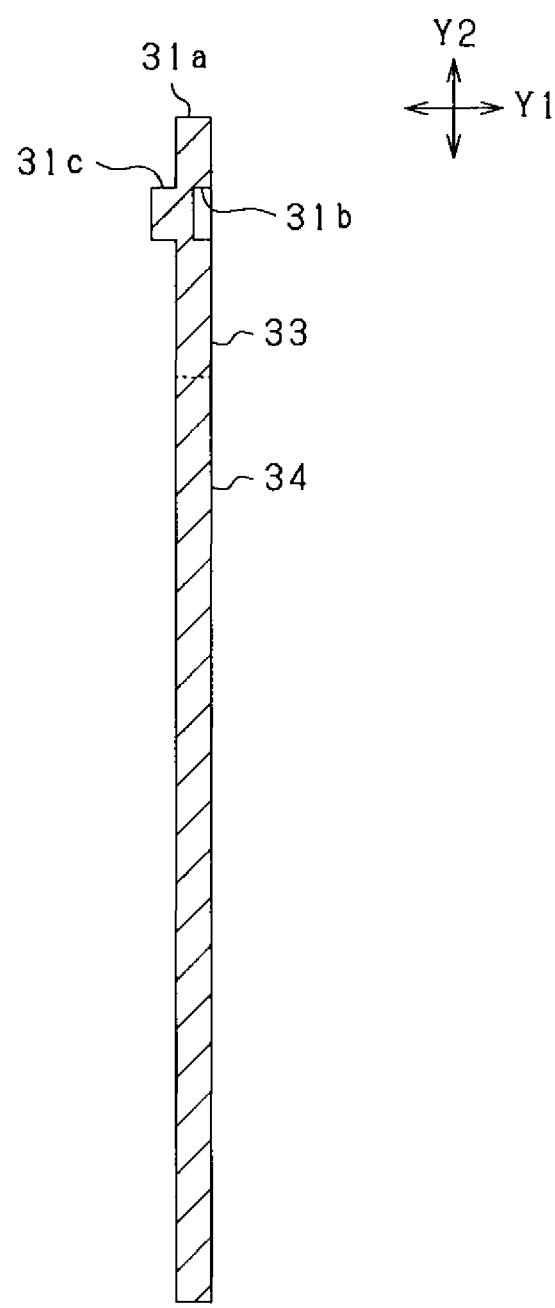
FIG. 3 is a diagram showing an axial cross-sectional view of a part of a stator core.

In more detail, as shown in FIGS. 2 and 3, a plurality of concave portions 31b (12 portions according to the present embodiment) are provided along the axial direction at one surface of each core sheet 31a in the axial direction. Respective concave portions 31b are arranged having the same intervals in the circumferential direction.

Further, a plurality of convex portions 31c (12 portions according to the present embodiment) are provided along the axial direction at the other surface of each core sheet 31a in the axial direction. Respective convex portions 31c are arranged having the same intervals in the circumferential direction. When the core sheets 31a are laminated, positions of the concave portion 31b and the convex portions 31c with respect to the radial direction and the circumferential direction are the same. Also, a dimension of the depth of the concave portions 31b in the axial direction and a dimension of the height of the convex portions 31c in the axial direction are substantially the same. The concave portions 31b and the convex portions 31c are formed in substantially the circular shape when viewed from the axial direction. Note that by using a stick-shaped jig, a pressing force is applied to the respective core sheets 31a from one surface side thereof to have the core sheets 31a plastically-deformed, whereby the concave portion 31b and the convex portion 31c can be simultaneously provided.

As shown in FIG. 3, the concave portion 31b and the convex portion 31c are provided in the back yoke 33. Also, the concave portions 31b and the convex portions 31c are provided within a root portion of the teeth 34 in the circumferential direction.

The respective convex portions 31c of the core sheet 31a are caulked to the respective concave portions 31b of the core sheet 31a, whereby respective core sheets 31a are fixed as being laminated. Thus, the respective core sheers 31a are prevented from moving in the circumferential direction and the radial direction (and axial direction) with respect to other core sheets 31a. Hence, position of the core sheets 31a with respect to the other core sheets 31a are fixed. According to the present embodiment, the concave portions 31b correspond to fixing hole portion.

The stator winding 32 is constituted of a three-phase winding which are Y-connected. The stator winding 32 produces magnetic flux by supplying power (AC power). The stator winding 32 may be provided with continuous winding, or may be provided with U-shaped conductor segments, in which each conductor having substantially rectangular cross section (rectangular cross-section) with a constant size is formed in substantially U-shape. The U-shaped conductor segments are inserted into the slots 35, where end portions of the U-shaped conductor segments are mutually connected.

The rotor 40 includes one or a plurality of pairs of magnetic poles along the circumferential direction and constitutes a part of the magnetic circuit. The rotor 40 is disposed to face the stator 30 in the radial direction. According to the present embodiment, the rotor 40 includes 10 magnetic poles (i.e. 5 pair of magnetic poles). The rotor 40 is provided with a rotor core 41 made of magnetic body, and a permanent magnet 42 fixed to the rotor core 41. Specifically, as shown in FIG. 2, the rotor 40 includes 10 permanent magnets 42 of which the polarities are alternately arranged in the circumferential direction. The permanent magnets 42 are embedded to accommodation holes provided in the rotor core 41 along the axial direction.

The rotor may be configured of a known configuration, for example, an Interior permanent magnet (IPM) rotor, or a surface permanent magnet (SPM) rotor. As the rotor 40, a rotor disposed in a field winding side may be utilized. According to the present embodiment, IPM type rotor is used. The rotary shaft 11 is inserted into the rotor 40 such that the rotor 40 is rotatably fixed to the rotary shaft 11 as the center of the rotary axis.

The motor 10 is connected to a control unit which is not shown. The control unit is constituted of a microcomputer including CPU, ROM, RAM and I/O, and performs various functions with the CPU that executes the program stored in the ROM. Note that the various functions may be accomplished by electronic circuit as a hardware. Alternatively, the various functions may be accomplished by processes as software executed on the computer.

As the functions of the control unit, for example, external power (e.g. battery) is converted to supply the motor 10 with the converted power, thereby generating a driving force. Also, the control unit has a function in which information about rotational angle transmitted from an angular sensor 12 is used to control the motor 10 (e.g. with current control).

In the case where the stator 30 is press-fitted to the inner periphery surface of the housing 20, it is required to increase a stress (pressure) applied to the stator 30 in the radial direction from the housing 20, so as to prevent the stator from being rotated. Hence, for example, sufficient press-fitting margin need to be secured before press-fitting such that the outer diameter of the stator core 31 is set to be larger than the inner diameter of the housing 20 before fixing. Further, as described in the present embodiment, the cover member 22 having the outer diameter as same as the inner diameter of the housing 20 is press-fitted to the inner periphery surface of the housing 20 in the vicinity of the opening portion of the housing 20. Thus, stress is applied to the opening portion of the housing 20 outward the radial direction from the cover member 22. Hence, the stress applied inward the radial direction in the center portion of the housing in the axial direction. That is, the stress radially applied to the stator core 31, which is located axially inside than the cover member 22 is positioned, is increased so as to appropriately prevent the stator from being rotated.

However, in this case, the stress applied to the stator core 31 from the housing 20 becomes excessively large, and may cause deformation of the stator core 31. When the stator core 31 is deformed, a problem arises that magnetic loss becomes large.

More specifically, due to deformation of the stator core 31, the magnetic path of the stator core 31 in which magnetic flux passes through becomes narrower. Moreover, due to bending of the stator core 31, magnetic saturation or a magnetic leak occurs and causes an increase in the magnetic loss. Also, due to the stress applied to the stator core 31, the material itself of the stator core 31 changes such that the magnetic loss increases. An increase in the magnetic loss may cause a decline of the torque. As a result, miniaturization and light weight are difficult to achieve for the motor 10. Further, when the amount of current is set to be larger in order to compensate the magnetic loss, an amount of heat becomes larger so that a heat radiation structure is required.

Furthermore, since the magnetic loss increases even in a case where the stator winding 32 is not applied with power, an EPS apparatus required to suppress the magnetic loss is unlikely to utilize the above-described configuration.

In this respect, in order to reduce deformation of the stator core 31, the shape of the stator core 31 has improved as follows.

Figure 4:
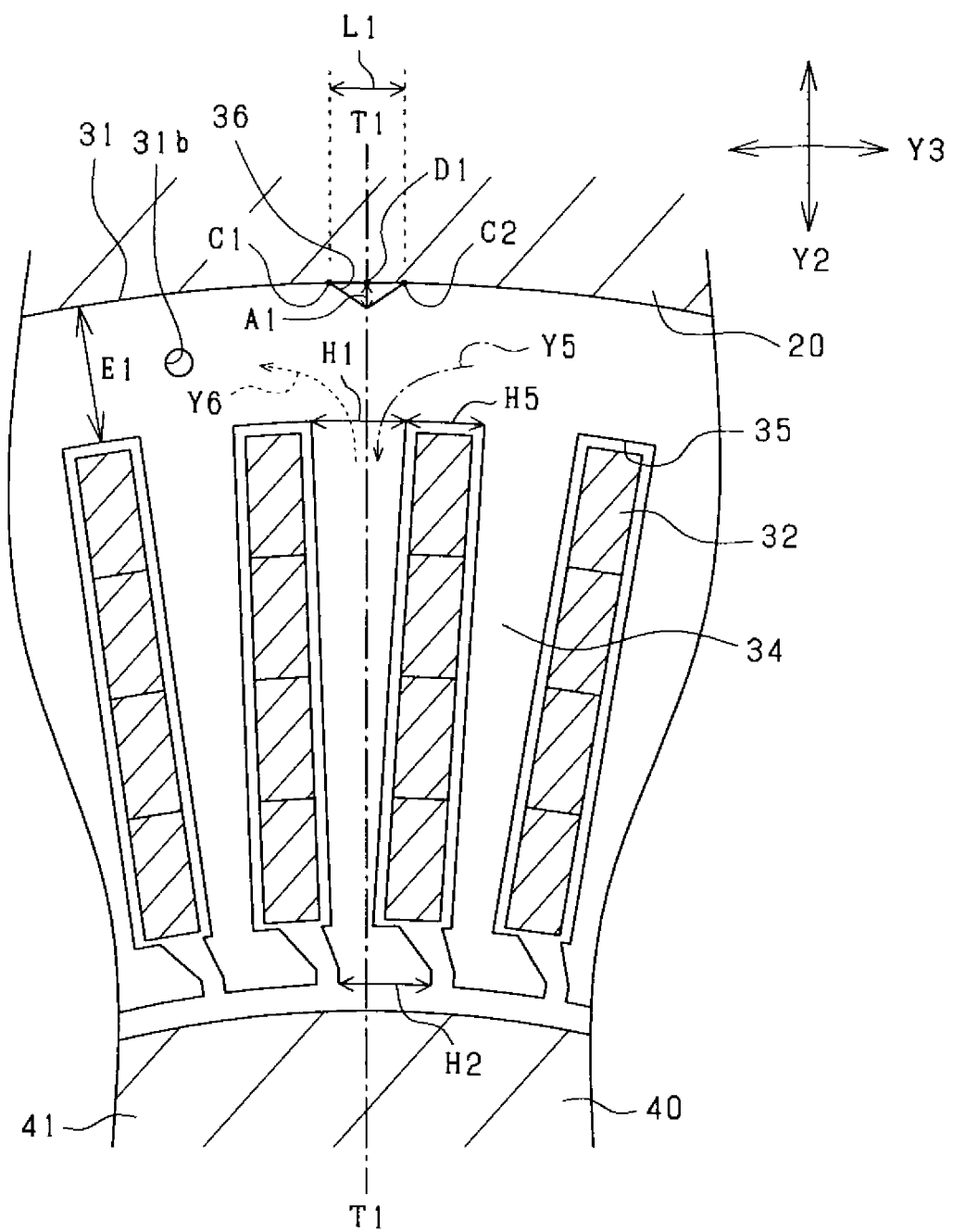
FIG. 4 is a diagram showing a radial cross-sectional view of an enlarged stator.

As shown in FIG. 2, a cutout portion 36 which opens outwards the radial direction is provided in the outer periphery of the back yoke 33. The cutout portion 36 is provided to overlap an area of the teeth 34 with respect to the circumferential direction. More specifically, as shown in FIG. 4, the stator core 31 is formed such that at least the center position T1 of the cutout portion 36 is located within a range H1 covering the root portion of the teeth 34 in the circumferential direction. According to the present embodiment, the cutout portion 36 is formed in a triangular shape in its cross-section, and the apex position thereof is positioned at the center position T1. The apex position of the cutout portion 36 is defined as the most radially inside position of the cutout portion 36. Moreover, the cutout portion 36 is formed symmetric laterally relative to the center position T1.

The center position T1 of the cutout portion 36 is provided to be within a range H2 of a tip end of the teeth 34. As shown FIGS. 2 and 4, according to the present embodiment, the tip end of the teeth 34 is formed extending in one side direction of the circumferential direction (clock wise direction in FIG. 2). Even in this case, the center position T1 of the cutout portion 36 is located within the range H2 of the tip end of the teeth 34.

Moreover, according to the present embodiment, the stator core 31 is formed such that the entire region of the cutout portion 36 in the circumferential direction (width L1 in the outer side in the radial direction of the cutout portion 36) is located within a range H1 covering the root portion of the teeth 34 in the circumferential direction. In other words, the cutout portion 36 and the teeth 34 are provided such that the width dimension L1 of the cutout portion 36 range H1 covering the root portion of the teeth 34.

The thickness dimension A1 of the cutout portion 36 in the radial direction (depth dimension of the cutout portion 36) is formed to be shorter than the thickness dimension E1 of the back yoke 33 in the radial direction. In other words, a condition of "thickness dimension A1 of cutout portion 36<thickness dimension E1 of back yoke 33" is satisfied. As shown in FIG. 4, the thickness dimension A1 of the cutout portion 36 in the radial direction corresponds to a distance between a cross point D1 between the line connecting the end portions C1 and C2 of the cutout portion 36 in the circumferential direction and the line along the radial direction passing through the center position T1, and the center position T1 (i.e. apex position) of the cutout portion 36.

Also, the thickness dimension A1 of the cutout portion 36 in the radial direction is formed to be shorter than the thickness dimension F1 of the housing 20 in the radial direction. In other words, a condition of "thickness dimension A1 of cutout portion 36<thickness dimension F1 of housing 20" is satisfied. The thickness dimension F1 of the housing 20 corresponds to the thickness dimension of a cylindrical portion of the housing 20 to which the stator core 31 is press-fitted. The thickness dimension A1 of the cutout portion 36 and the thickness dimension F1 of the housing 20 may preferably be designed to satisfy a relationship $A1/F1>0.1$.

Also, the thickness dimension A1 of the cutout portion 36 is set such that a value where the thickness dimension A1 of the cutout portion 36 is subtracted from the thickness dimension E1 of the back yoke 33 is set to be larger than the range H1 of the root portion of the teeth 34 in the circumferential direction. The thickness dimension A1 of the cutout portion 36 and the thickness dimension E1 of the back yoke 33 may preferably be designed to satisfy the relationship A1/E1>0.15.

The thickness dimension A1 of the cutout portion 36 is formed to be shorter than the width dimension L1. Preferably, the thickness dimension A1 and the width dimension L1 of the cutout portion 36 may be designed to satisfy the relationship of A1/L1≤0.5. Further, the thickness dimension A1 of the cutout portion 36 may preferably be designed such that the distance G1 from the center of axis O of the rotary shaft 11 to the outer periphery of the housing 20, and the thickness dimension A1 of the cutout portion 36 satisfy the relationship of A1/G1>0.005.

Then, the cutout portion 36 is provided for the entire region of the stator core 31 in the axial direction. The positions of the cutout portions 36 with respect to the circumferential direction are the same in the axial direction. In other words, each cutout portion 36 is disposed in a linear line along the axial direction.

Also, a plurality of cutout portions 36 are provided in the outer periphery of the stator core 31 (at 12 positions). The respective cutout portions 36 are provided at the same intervals in the circumferential direction (the same angular intervals, i.e. 30 degrees interval according to the present disclosure). In the stator 30 according to the present disclosure, the number of slots is 60 and the number of pair of magnetic poles is "5". Hence, the rotation where the rotational shaft 11 rotates for 30 [deg] (i.e. mechanical angle 30 degree), corresponds to 360 degrees of rotation in the electrical angle (1 rotation).

Therefore, 360 degrees rotation (1 rotation) in the electrical angle is equivalent to passing 12 slots 35 or 12 teeth 34. Accordingly, the number of cutoff portions 36 may preferably be set to a value in which the number of slots 35 is divided by the number of pair of magnetic poles in the rotor 40, or a multiple of the value. Thus, distortion of the magnetic flux caused by each cutout portion 36 at the same electrical angle can be produced, whereby the rotating magnetic field can be uniform so that the rotary electric machine can readily be controlled. The number of cutout portions 36 may be set to be small number, as long as there is no inconvenience during the press-fitting. Hence, according to the present embodiment, as described above, the cutout portions 36 are provided at 12 portions (=60/5) at the same intervals.

Also, in the case where the convex portion 31c is caulked to the concave portion 31b, and if the concave portion 31b is present in the vicinity of the cutout portion 36, the concave portion 31b may be deformed so as to release the stress applied to the cutout portion 36 from the convex portion 31c. When the concave portion 31b is deformed, fixing power of the concave portion 31b applied to the convex portion 31c may be weaken. Also, the concave portion 31b is provided so that the magnetic path, through which the magnetic flux flows, is deformed. Hence, in the case where the concave portion 31b is present in the vicinity of the cutout portion 36, distortion of the magnetic flux is superposed which may cause an increase in the magnetic loss.

In this respect, the cutout portions 36 are provided at positions which are not overlapped with the concave portions 31b in the radial direction and the circumferential direction. Specifically, each cutout portion 36 is disposed around teeth 34 of a predetermined side (clock wise direction according to the present embodiment) among teeth 34 adjacent to the teeth 34 at which the concave portion 31b is provided. Further, the cutout portion 36 is disposed to be located outer side in the radial direction than the concave portion 31b is.

Note that in the case where the concave portion 31b is provided in the back yoke 33, the magnetic flux is distorted similar to the case where the cutout portion 36 is provided. Hence, similar to the cutout portion 36, the number of the concave portions 31b may preferably be set to a value in which the number of slots 35 is divided by the number of pair of magnetic poles in the rotor 40, or a multiple of the value. Thus, distortion of the magnetic flux caused by the cutout portion 36 at the same electrical angle can be produced, whereby the rotating magnetic field can be uniform so that the rotary electric machine can readily be controlled. Thus, distortion of the magnetic flux caused by the concave portion 31b at the same electrical angle can be produced, whereby the rotating magnetic field can be uniform so that the rotary electric machine can readily be controlled. Further, the number of concave portions 31b may preferably be small, as long as there is no inconvenience during the caulking. In this regard, according to the present embodiment, as described above, the concave portions 31b are disposed at 12 positions (i.e. 60/5) at the same intervals.

The effects and advantages obtained from the above-described configurations will be described as follows.

The cutout portions 36 are provided in the outer periphery of the back yoke 33. The cutout portions 36 have openings towards outside in the radial direction. Thus, even when the back yoke 33 is press-fitted to the inner peripheral surface of the housing 20, the cutout portions 36 release the stress applied to the back yoke 33 in the radial direction. Hence, the back yoke 33 can be prevented from being deformed.

The magnetic flux flows in the magnetic material at the shortest distance theoretically under a condition in which no magnetic saturation exists. Since the magnetic flux flows from/to the teeth 34, as indicated by an arrow Y5 shown in FIG. 4, the magnetic flux flowing through the back yoke 33 flows into the teeth 34 such that a flow of the magnetic flux draws a circular arc towards the teeth 34. Also, as indicated by an arrow Y6, the magnetic flux flowing from the teeth 34 flows into the back yoke 33 such that a flow of the magnetic flux draws a circular arc. The magnetic density is expected such that the closer towards inside in the radial direction, the higher the magnetic density is. Therefore, in the outer periphery of the back yoke 33, the magnetic flux is difficult to flow through a range H1 where the teeth 34 is provided, compared to a range H5 where the teeth 34 is not provided (i.e. range of the slot 35). In other words, the range H1 where the teeth 34 is not provided in the outer periphery of the back yoke 33, is regarded as a region where the flow of the magnetic flux is not influenced by the cutout portion 36 even when being provided.

In this respect, the cutout portions 36 are provided, among the outer periphery of the back yoke 33, in an area overlapping with the range H1 of the teeth 34 in the circumferential direction. Hence, the cutout portions 36 prevents the thickness dimension of a part of the back yoke 33 from being shortened. In other words, the width of the magnetic path is secured so that the cutout portion 36 is unlikely to disturb the magnetic flux passing through the back yoke 33. Hence, a distortion of the magnetic flux caused by the cutout portion 36 can be suppressed. Accordingly, magnetic saturation and the flow of the magnetic flux can be prevented from being distorted. Further, the magnetic loss is suppressed, and small sizing and weight reduction can be accomplished for the motor 10. An amount of current is reduced so that an amount of heat can be suppressed. Moreover, torque ripple can be suppressed.

As shown in FIG. 4, since the magnetic flux flows in/out from/to the teeth 34, if the magnetic path corresponding to the width (range H1) of the teeth 34 in the circumferential direction is secured, the magnetic flux flows in/out from/to the teeth 34 is able to path through the teeth without producing the magnetic saturation. For this reason, the cutout portion 36 is provided. The dimension of the cutout portion 36 is set such that a value where the thickness dimension A1 of the cutout portion 36 in the radial direction is subtracted from the thickness dimension E1 of the back yoke 33 in the radial direction, is larger than the width (range H1) of the teeth 34 in the circumferential direction.

Thus, the magnetic saturation caused by the magnetic flux from the teeth 34 can be prevented from occurring in the back yoke 33. As a result, the flow of the magnetic flux can be prevented from being distorted.

Note that, every time when the rotor rotates by 360 degrees of electrical angle (i.e. every one cycle of AC current), the rotor passes through a plurality of slots 35 (i.e. the number of slots is defined as a value where the number of slots 35 is divided by the number of pair of magnetic poles). In this regard, even when a distortion of the magnetic flux occurs due to the cutout portion 36, current control can readily be accomplished if distortion of the magnetic flux occurs at the same electrical angle due to the cutout portion 36. For example, when the distortion of the magnetic flux occurs at the same electrical angle, the current control can readily be performed so as to suppress a change in the magnetic field due to the distortion of the magnetic flux. In the case where torque ripple occurs at constant periods compared to a case where torque ripples occurs irregularly, the driver who uses the EPS apparatus is unlikely to feel discomfort. For this reason, the number of slots of the cutout portions 36 is set to be a value where the number of slots 35 is divided by the number of pair of magnetic poles of the rotor 40, and respective cutout portions 36 are arranged in the circumferential direction at the same intervals. Thus, the current control can readily be performed and torque ripple can be reduced.

When the core sheet 31a includes the concave portions 31b, the magnetic flux is deformed due to the concave portions 31b. Hence, when the cutout portions 36 overlap the concave portions 31b in the circumferential direction or the radial direction, distortion of the magnetic flux caused by the cutout portions 36 and distortion of the magnetic flux caused by the concave portions are superimposed to each other such that the distortion of the magnetic flux becomes larger and may cause a magnetic saturation. Thus, the cutout portions 36 are disposed not to be overlapped with the concave portions 31b in the circumferential direction and the radial direction so as to prevent the distortion of the magnetic flux cause by the cutout portion 36 and the distortion of the magnetic flux caused by the concave portion 31b from being superimposed to each other. Thus, the distortion of the magnetic flux can be prevented from being larger, and the magnetic saturation and the magnetic leakage can be avoided.

Also, the concave portions 31b and the convex portions 31c are provided in a range of a teeth 34 adjacent to the teeth 34 where the cutout portion 36 is disposed in the circumferential direction (i.e. range H1 of an adjacent teeth 34). Thus, the cutout portion 36 can be disposed close to the concave portion 31b and the convex portion 31c which are fixed by a caulking. Hence, in the case where the convex portion 31c is caulked to be fixed to the concave portion 31b, the stress is released to the cutout portion 36 to prevent the concave portion 31b from being deformed. As a result, the caulk-fixing can be performed reliably.

The cover member 22 is disposed in the housing 20 at a portion in the outer side of the stator 30 in the axial direction, as a fixing member having a disc shape press-fitted to the inner periphery surface of the housing. Thus, the stress applied to the stator core 31 in the radial direction is enhanced, the stator 30 is more press-fitted to the housing 20. As a result, the stator 30 can be reliably prevented from being rotated in the circumferential direction.

The cutout portions 36 are disposed symmetrically in the circumferential direction with respect to the center line along the radial direction. Thus, the stress from the housing 20 can be released equally so that the back yoke 33 can be prevented from being deformed because of concentrated stress. Moreover, distortion of the magnetic flux caused by the cutout portions 36 is equally produced so that the rotary electric machine can readily be controlled.

The cross-sectional shape of the each cutout portion 36 in the radial direction is designed to be a triangle shape. Since stress is likely to concentrate at an apex portion of the polygon, the triangle shape is used. Compared to the polygonal shape, the stress can be released equally, so that the back yoke 33 can be prevented from being deformed because of the stress-concentration. Also, since the distortion caused by the cutout portion 36 can be equally produced, the rotary electric machine can readily be controlled.

The cross-sectional shape (traverse section) of the inner periphery surface of the housing is designed to be a true circular shape having no roughness. Thus, the housing 20 can be prevented from being deformed because of the stress from the stator core 31. Further, the housing 20 can readily be manufactured.

Other Embodiments

Note that the present disclosure is not limited to the above-described embodiments and various modification can be accomplished without departing from the split of the present disclosure.

In the above-described embodiments, the number of slots 35, the shape of the stator windings 32, the manner of winding and the like may be arbitrarily changed. Further, the number of pair of magnetic poles may be arbitrarily changed. Also, an arrangement and the number of cutout portions 36 may be arbitrarily changed. The thickness dimension of the cutout portions 36 in the radial direction and the width dimension of the cutout portions 36 in the circumferential direction and the shape of the cutout portions 36 may be arbitrarily changed. The shape, arrangement, size and the number of concave portions 31b and the convex portions 31c may be arbitrarily changed. Further, the concave portions 31b and the convex portions 31c may not be provided. For example, adhesion method may be used for the fixing. Also, the rotor 40 may be provided by laminating, whereby the concave portions 31b and the convex portions 31c may not be formed.

Figure 5:
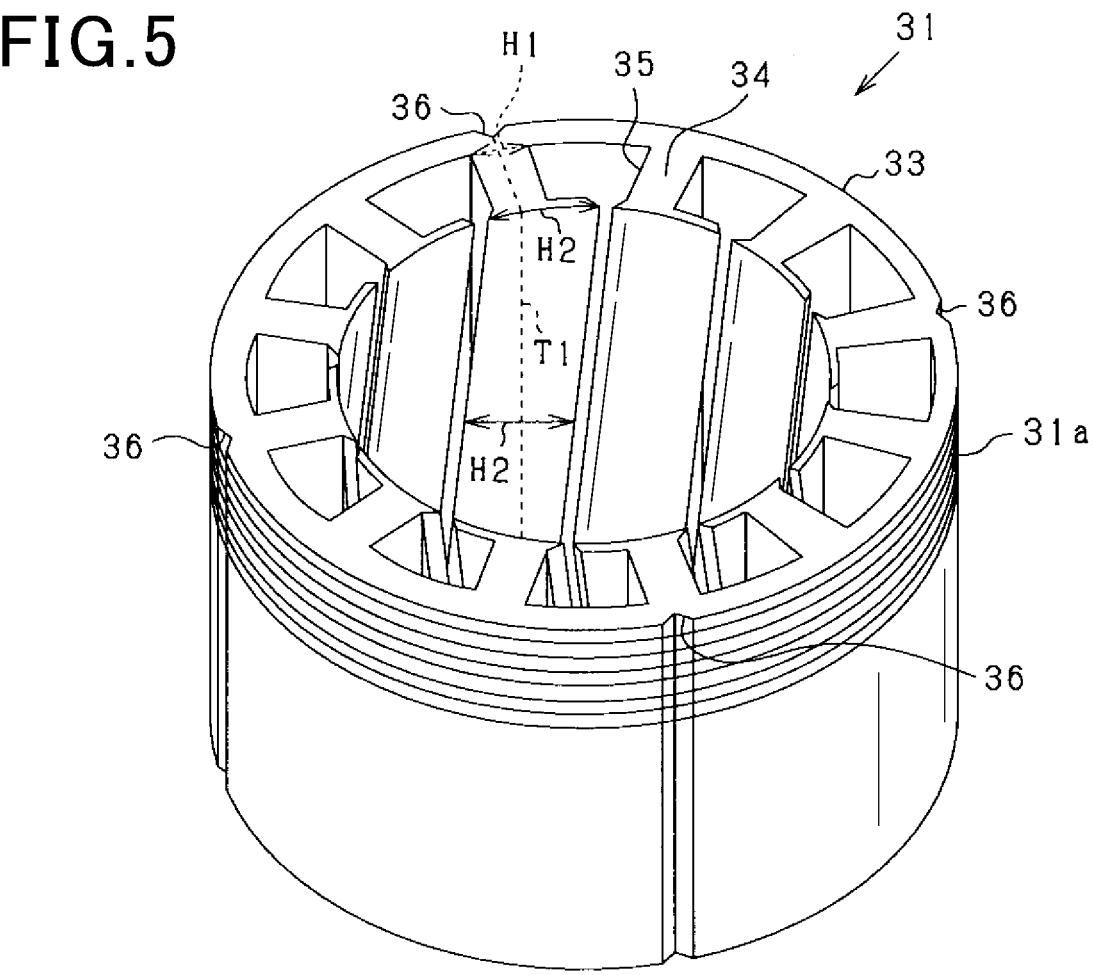
FIG. 5 is a diagram showing a perspective view of a skew structure of teeth.

According to the above-described embodiments, the teeth 34 (and slots 35) may have a skew structure in which the positions thereof in the circumferential direction are shifted stepwisely or gradually (continuously) through the axial direction. FIG. 5 exemplifies a skew structure in which the positions are gradually shifted. Note that the number of teeth 34 and the slots 35 are set to 12 for convenience of the drawing. In this case, each of the cutout portions 36 is provided to be present within a range of the teeth 34 for any positions in the axial direction.

More specifically, at least the center position T1 of the cutout portion 36 in any positions in the axial direction is located to be within the range H1 of the root portion of the teeth 34. Note that the center position T1 (apex position) of the cutout portion 36 is indicated by a dotted line. Preferably, the center position T1 of the cutout portion 36 may be located within the range H2 of the tip end portion of the teeth 34 in any positions in the axial direction. More preferably, all of the cutout portions 36 in the circumferential direction, even in any locations in the axial direction, may be within the range H1 of the root portion of the teeth 34 and within the range H2 of the tip end portion of the teeth 34.

Thus, the thickness of the back yoke 33 in the radial direction can be secured in any positions in the axial direction, thereby securing the magnetic path through which the magnetic flux flows. In other words, magnetic loss can be suppressed.

Figure 6:
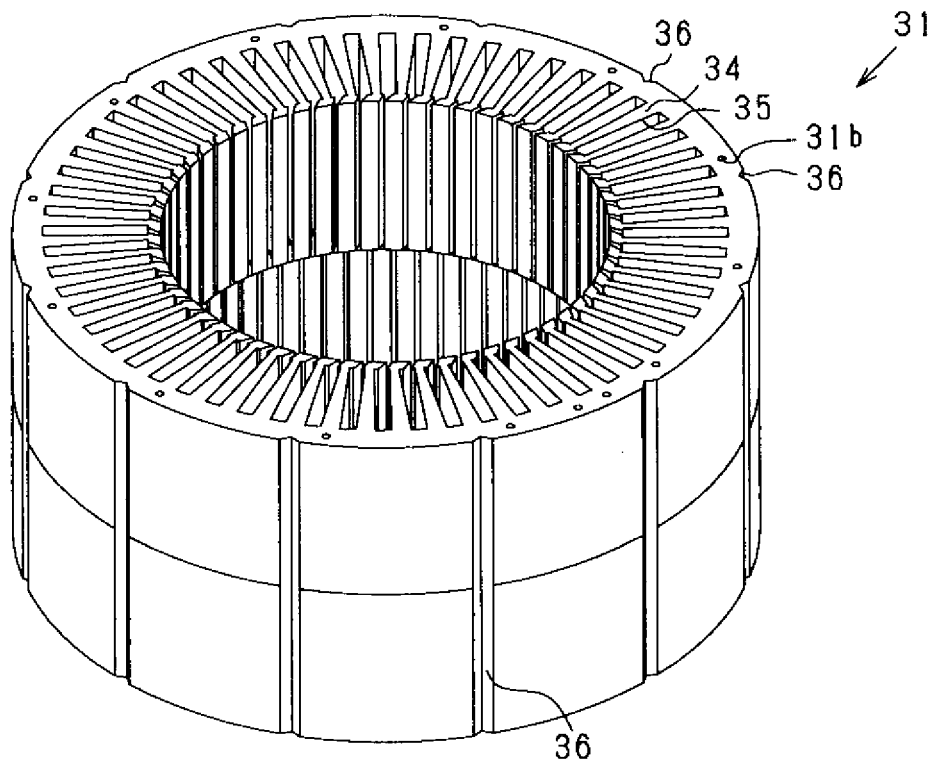
FIG. 6 is a diagram showing a perspective view of a skew structure of teeth.

FIG. 6 illustrates a skew structure having stepwise-shifting feature. Even in this case, similar to FIG. 5, the cutout portions 36 may preferably be located within the teeth 34 in any position in the axial direction.

In the above-described embodiments, the cross-sectional shape of the cutout portions 36 in the radial direction may be an arc shape. Thus, the stress is equally released so that the back yoke can be prevented from being applied with concentrated stress, thereby suppressing the distortion of the back yoke 33. Further, the distortion of the magnetic flux caused by the cutout portion 36 can be equally produced. Hence, the rotary electric machine can readily be controlled.

In the above-described embodiment, the respective core sheet 31a includes the concave portions 31b and the convex portions 31c so as to perform caulk-fixing. Alternatively, through holes can be provided along the axial direction instead of using the concave portions 31b and the convex portions 31c. A rivet as a stick-shaped fastening tool extending along the axial direction may be inserted into the through hole in a state where the respective core sheets 31a are laminated, whereby the core sheets are caulk-fixed at both ends in the axial direction by using the rivet. In this case, the through holes correspond to fixing hole portion. Even the thorough holes are provided, similar to the case using the concave portion 31c, the magnetic flux is distorted. Accordingly, the cutout portions 36 may preferably be provided not to overlap the through holes in the circumferential direction and the radial direction.

The motor 10 in the above-described embodiments may be embodied to have a function of either a generator or a motor which is mounted on the vehicle, or both functions of the generator and the motor. Further, the above-described motor 10 may be utilized for other purposes other than the on-vehicle equipment.

In the above-described embodiments, a protrusion that engages with the cutout portion 36 in the circumferential direction may be provided in the inner periphery surface of the housing 20. Also, the cover member 22 may have the same outer diameter as that of the housing 20 similar to the cover member 21, and may be fixed to the opening of the housing 20 by a screw or the like.

What is claimed is:
1. A rotary electric machine comprising:
a stator having a stator core having an annular shape;
a rotor disposed facing the stator in a radial direction, including one pair or a plurality of pairs of magnetic poles along a circumferential direction; and
a housing having a cylindrical shape, in which the stator core is fixed to an inner periphery surface thereof,
wherein
the stator core includes a back yoke having an annular shape fixed to the inner periphery surface of the housing, and teeth provided along the radial direction from an inner periphery of the back yoke;
a cutout that opens outwards the radial direction is provided on an outer periphery of the back yoke; and
the cutout is provided to overlap a range of the teeth in the circumferential direction,
wherein
the stator core is formed such that a value, in which a thickness dimension of the cutout in the radial direction is subtracted from a thickness dimension of the back yoke in the radial direction, is set to be larger than a width of the teeth in the circumferential direction, and
wherein
A1 is the thickness dimension of the cutout in the radial direction,
F1 is a thickness dimension of the housing in the radial direction, and
the thickness dimension of the cutout and the thickness dimension of the housing satisfy a relationship $A1/F1 > 0.1$.

2. The rotary electric machine according to claim 1, wherein
the teeth is provided in plural number in the circumferential direction;
a slot is provided between the teeth of the stator core, a stator winding being wound around the slot;
the cutout is provided in plural number, and arranged in the circumferential direction at the same intervals;
the number of cutouts is set to be a value in which the number of slots is divided by the number of pair of magnetic poles in the rotor, or a multiple of the value.

3. The rotary electric machine according to claim 1, wherein
the stator core is composed of a plurality of core sheets each having a plate shape and being laminated in an axial direction of the stator core;
each core sheet includes a fixing hole portion along the axial direction and a convex portion;
the convex portion or a stick-shaped fastening tool extending along the axial direction is inserted into the fixing hole portion, thereby fixing the core sheets therebetween; and
the cutout is provided at positions which are not overlapped with the fixing hole portion in the radial direction and the circumferential direction.

4. The rotary electric machine according to claim 3, wherein
the cutout is provided in the teeth adjacent to the fixing hole portion in the circumferential direction.

5. The rotary electric machine according to claim 1, wherein
the teeth is configured to have a skew structure in which positions of the teeth in the circumferential direction are shifted stepwisely or continuously through an axial direction of the stator core; and
each of the cutout is provided to be present within a range of the teeth for any positions in the axial direction.

6. The rotary electric machine according to claim 1, wherein
a fixing member having a disc shape is disposed in the housing, the fixing member being press-fitted to the inner periphery surface of the housing in an outer side of the stator in an axial direction of the stator core.

7. The rotary electric machine according to claim 1, wherein
the cutout is disposed bisymmetrically in the circumferential direction with respect to a center line along the radial direction.

8. The rotary electric machine according to claim 1, wherein
a cross-sectional shape of the cutout in the radial direction is set to be an arc shape or a triangular shape.

9. The rotary electric machine according to claim 1, wherein
a cross-sectional shape of the inner periphery surface of the housing in the radial direction is a true circular shape having no roughness.

10. The rotary electric machine according to claim 1, wherein
A1 is a thickness dimension of the cutout in the radial direction,
G1 is a distance from a center axis of a shaft of the rotor to the outer periphery of the housing, and
the thickness dimension of the cutout and the distance from the center axis of the shaft of the rotor to the outer periphery of the housing satisfy a relationship of $A1/G1>0.005$.

* * * * *